United States Patent
Kadoriku et al.

(10) Patent No.: US 9,383,074 B2
(45) Date of Patent: Jul. 5, 2016

(54) LIGHT-EMITTING DEVICE AND PRODUCTION METHOD FOR SYNTHETIC RESIN GLOBE FOR SAID LIGHT-EMITTING DEVICE

(75) Inventors: Shinji Kadoriku, Osaka (JP); Ryoma Murase, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 418 days.

(21) Appl. No.: 13/703,788

(22) PCT Filed: Mar. 16, 2012

(86) PCT No.: PCT/JP2012/001861
§ 371 (c)(1),
(2), (4) Date: Dec. 12, 2012

(87) PCT Pub. No.: WO2012/124351
PCT Pub. Date: Sep. 20, 2012

(65) Prior Publication Data
US 2013/0083526 A1    Apr. 4, 2013

(30) Foreign Application Priority Data
Mar. 16, 2011 (JP) ................. 2011-057510

(51) Int. Cl.
*F21V 1/00* (2006.01)
*F21V 3/02* (2006.01)
(Continued)

(52) U.S. Cl.
CPC .............. *F21V 3/02* (2013.01); *B29C 45/0055* (2013.01); *B29C 49/02* (2013.01); *F21K 9/135* (2013.01);
(Continued)

(58) Field of Classification Search
CPC .......... F21K 9/13; F21K 9/135; F21K 9/1355
USPC ....................................................... 362/235
See application file for complete search history.

(56) References Cited

U.S. PATENT DOCUMENTS 3,388,248 A * 6/1968 Auerbach ................ 362/311.14
4,164,012 A * 8/1979 Gulliksen ........... F21S 48/1388
362/282
(Continued)

FOREIGN PATENT DOCUMENTS

CN    101275731    10/2008
CN    102714266    10/2012
(Continued)

OTHER PUBLICATIONS

International Search Report issued May 29, 2012 in International (PCT) Application No. PCT/JP2012/001861.
(Continued)

*Primary Examiner* — Robert May
*Assistant Examiner* — Bryon T Gyllstrom
(74) *Attorney, Agent, or Firm* — Wenderoth, Lind & Ponack, L.L.P.

(57) ABSTRACT

A synthetic resin globe for a light-emitting device is produced by molding an intermediate product with an injection molding die, softening the intermediate product in a heating apparatus, expanding it with compressed air in a die to form a globe shape, transferring a concavo-convex shape formed in a core of the injection molding die to form a concavo-convex shape on an inner wall of the intermediate product, so that the concavo-convex shape can be easily formed into a desired shape in a lower part of an inner wall of the globe.

20 Claims, 13 Drawing Sheets

(51) Int. Cl.
*B29C 45/00* (2006.01)
*F21V 29/00* (2015.01)
*B29C 49/02* (2006.01)
*F21V 3/04* (2006.01)
*F21V 7/00* (2006.01)
*B29L 31/00* (2006.01)
*F21K 99/00* (2016.01)
*F21V 13/02* (2006.01)
*B29C 49/06* (2006.01)
*F21Y 101/02* (2006.01)

(52) U.S. Cl.
CPC ............... *F21V 3/049* (2013.01); *F21V 3/0418* (2013.01); *F21V 7/0008* (2013.01); *F21V 29/004* (2013.01); *B29C 49/06* (2013.01); *B29C 2791/006* (2013.01); *B29C 2791/007* (2013.01); *B29C 2793/009* (2013.01); *B29L 2031/747* (2013.01); *F21K 9/50* (2013.01); *F21K 9/90* (2013.01); *F21V 13/02* (2013.01); *F21Y 2101/02* (2013.01)

(56) References Cited

U.S. PATENT DOCUMENTS

| | | | | |
|---|---|---|---|---|
| 4,285,657 | A * | 8/1981 | Ryder | 425/525 |
| 5,642,933 | A * | 7/1997 | Hitora | 362/243 |
| 6,890,642 | B2 | 5/2005 | Kaminsky et al. | |
| 6,948,829 | B2 * | 9/2005 | Verdes et al. | 362/227 |
| 7,547,237 | B1 * | 6/2009 | Zou | 439/699.2 |
| 7,670,031 | B2 * | 3/2010 | Ogawa et al. | 362/311.02 |
| 2003/0031015 | A1 | 2/2003 | Ishibashi | |
| 2003/0170442 | A1 | 9/2003 | Kaminsky et al. | |
| 2004/0209210 | A1* | 10/2004 | Long | 431/111 |
| 2005/0174769 | A1* | 8/2005 | Yong et al. | 362/235 |
| 2007/0236912 | A1* | 10/2007 | Porchia | A61L 9/03 362/95 |
| 2007/0267976 | A1* | 11/2007 | Bohler et al. | 315/112 |
| 2008/0062703 | A1* | 3/2008 | Cao | 362/311 |
| 2009/0296387 | A1* | 12/2009 | Reisenauer et al. | 362/235 |
| 2010/0097811 | A1 | 4/2010 | Betsuda | |
| 2010/0301726 | A1 | 12/2010 | Helbing et al. | |
| 2010/0314808 | A1 | 12/2010 | Chuang | |
| 2012/0273812 | A1* | 11/2012 | Takahashi et al. | 257/88 |

FOREIGN PATENT DOCUMENTS

| | | |
|---|---|---|
| JP | 58-209531 | 12/1983 |
| JP | 62-58504 | 3/1987 |
| JP | 3-7207 | 1/1991 |
| JP | 4-164825 | 6/1992 |
| JP | 2004-038146 | 2/2004 |
| JP | 2004-230684 | 8/2004 |
| JP | 2006-324036 | 11/2006 |
| JP | 2007-048883 | 2/2007 |
| JP | 2007-87629 | 4/2007 |
| JP | 3150914 | 6/2009 |
| JP | 2010-040364 | 2/2010 |
| JP | 2010-62005 | 3/2010 |
| JP | 2010-97890 | 4/2010 |
| JP | 3158378 | 4/2010 |
| JP | 2010-157459 | 7/2010 |
| JP | 2011-23299 | 2/2011 |
| JP | 2011-039292 | 2/2011 |
| WO | WO 2005090852 A3 * | 1/2006 |
| WO | WO 2009091562 A2 * | 7/2009 ............ F21K 99/00 |
| WO | 2010/146518 | 12/2010 |

OTHER PUBLICATIONS

International Preliminary Report on Patentability and Written Opinion of the International Searching Authority issued Sep. 26, 2013 in International (PCT) Application No. PCT/JP2012/001861.

Supplementary European Search Report issued May 23, 2014 in European Application No. EP 12 75 6964.

Chinese Office Action and Search Report issued Jan. 12, 2015 in corresponding Chinese Application No. 201280001667.2 with English translation.

Office Action issued Jun. 19, 2015 in European Application No. 12 756 964.8.

Office Action and Search Report issued Sep. 1, 2015 in Chinese Application No. 201280001667.2, with partial English translation.

Office Action issued Jan. 29, 2016 in European Application No. 12 756 964.8.

* cited by examiner (a)   (b)

(a)

(b)

(c)

(d)

(a)

(b)

(a)

(b)

(c)

(d)

LIGHT-EMITTING DEVICE AND PRODUCTION METHOD FOR SYNTHETIC RESIN GLOBE FOR SAID LIGHT-EMITTING DEVICE

TECHNICAL FIELD

The present invention relates to a lighting bulb, and a method for producing a globe used in the lighting bulb.

BACKGROUND ART

FIG. 9 shows a representative configuration diagram of a lighting bulb. FIG. 9 is a configuration diagram of an LED bulb which realizes a large light distribution. As shown in FIG. 9, a base 2 mounting a semiconductor light-emitting element 21 is fixed to an aluminum plate 1. In addition, a first reflection plate 31 and a second reflection plate 32 are fixed to the aluminum plate 1. A heat sink 4 is fixed around the aluminum plate 1, and a bracket 5 is fixed to a lower part of the heat sink 4. A power supply circuit (not shown) is provided in a void space surrounded by the aluminum plate 1, the heat sink 4, and the bracket 5, and a globe 6 for protecting the base 2 is fixed to an upper surface of the aluminum plate 1.

Light emitted from the semiconductor light-emitting element 21 is divided into a light 71 which passes through a window part 311 of the first reflection plate 31 and goes straight, a light 72 which passes through the window part 311 of the first reflection plate 31, is reflected by the second reflection plate 32, and changes its direction to a lateral direction, and a light 73 which is reflected by the first reflection plate 31, and changes its direction to a lower direction. In order to increase a light distribution angle of this bulb, it is preferable that the light 73 which is reflected by the first reflection plate 31 and passes through the globe 6 be diffused by the globe 6. Therefore, as a material of the globe, a synthetic resin material containing a diffusion material is used in general.

In order to make the light distribution uniform, a shape of the globe 6 preferably has a spherical or ellipsoidal body. In order to utilize more backward light, an outer diameter of the globe 6 is preferably larger than an outer diameter of the heat sink 4. That is, the shape of the globe 6 preferably has a pouched shape. Therefore, according to a conventional method for producing the globe 6 mainly used, a cylindrical intermediate product having a bottom is previously produced by an injection molding method, and the intermediate product is expanded by compressed air in a blow molding die, whereby it can be molded into a desired globe shape.

A process for producing the globe by the conventional blow molding method will be described with reference to FIGS. 10(a) to 10(d). FIG. 10(a) is a view showing a state in which an intermediate product 8 (parison) molded by the injection molding method and inserted in a rod-shaped heating apparatus to be previously softened is set in a blow molding die 10 and the blow molding die 10 is closed. Then, the intermediate product 8 is expanded with compressed air supplied from a supply port 11. FIG. 10(b) is a view showing a state in which the intermediate product 8 is expanded with the compressed air and molded into a desired globe shape.

FIG. 10(c) is a view showing a shape of the globe 6 molded by the above-described method. In the blow molding, it is necessary to strongly press the intermediate product 8 against a holder part 9 which supplies the compressed air to the intermediate product 8 so as to prevent the air from leaking to the holder part 9. Therefore, a presser margin 82 having a projection is provided in the intermediate product 8, and the intermediate product 8 is strongly fixed to the holder part 9 by a presser jig through the presser margin 82. The presser margin 82 is cut at a cut surface 12 after molded, whereby the globe shape is formed as shown in FIG. 10(d).

According to PTL 1, the globe 6 is produced by a method in which a synthetic resin sheet is fixed to a jig by vacuum suction, expanded in a molding die with compressed air, and formed into a desired globe shape, and then an unnecessary part is cut.

The method of the PTL 1 is described with reference to FIGS. 11(a) to 11(f). As shown in FIG. 11(a), a molding apparatus is prepared such that a clamp 403 is arranged on a split die 402 for blow molding, and a rod-shaped plug 404 is arranged above the clamp 403. The split mold 402 is split to right and left and stands by. A synthetic resin sheet 401 is sandwiched between the clamp 403. The synthetic resin sheet 401 has been previously heated and softened, and horizontally fixed as it is sandwiched by the clamp 403.

As shown in FIG. 11(b), when the plug 404 is lowered, the heated and softened synthetic resin sheet 401 is pressed vertically with a spherical-shaped end of the plug 404, and extended into the split mold 402 below an opening 405 of the clamp 403.

The plug 404 has several venting holes 406 in its periphery wall. The venting holes 406 are connected to a vacuum apparatus and a compressed air generation apparatus (not shown) through a passage 407 in an attachment part. As shown in FIG. 11(c), when the vacuum apparatus is activated, and the softened synthetic resin sheet 401 is immediately drawn by vacuum through the venting holes 406 of the plug 404, the synthetic resin sheet 401 becomes a synthetic resin sheet 410 adhering to the plug 404.

Then, as shown in FIG. 11(d), the split die 402 is closed. Then, as shown in FIG. 11(e), when the compressed air generation apparatus is activated and compressed air is ejected from the venting holes 406, the synthetic resin sheet 410 adhered to the plug 404 is adhered to a die surface 408 of the split die 402.

Then, as shown in FIG. 11(f), the split die 402 is opened, the clamp 403 is opened, and a molded product 409 is taken out.

The unnecessary part of the molded product 409 which has been taken out is cut in a next step, whereby the globe 6 is formed.

PATENT LITERATURE

PTL1: JP S58-209531 A
PTL2: JP H04-164825 A

SUMMARY OF INVENTION

Technical Problem

By increasing a content of the diffusion material contained in the synthetic resin, light diffusivity is increased in the globe 6 and a light distribution angle can be increased. However, at the same time, there is a problem that light transmittance is lowered and light extracting efficiency is reduced.

In addition, there is a method for diffusing light passing through the globe 6 by forming a concavo-convex shape on a surface of the globe 6. According to this method, light absorptance in the globe 6 does not change, so that there is a merit that an amount of decrease in light extracting efficiency associated with an increase in diffusivity can be smaller than that of the case where the content of the diffusion material in the synthetic resin is increased.

However, when the concavo-convex shape is provided on the surface of the globe 6, there is a problem that an outer appearance quality is reduced and dust is likely to be attached on the concavo-convex shape. Accordingly, the concavo-convex shape is preferably provided on an inner wall of the globe 6. According to the conventional blow molding method, even when the concavo-convex shape is formed on the inner wall of the intermediate product, the concavo-convex shape formed on the inner wall of the intermediate product becomes straight when expanded by the compressed air. That is, there is a problem that it is hard to maintain the necessary shape.

The PTL 2 discloses a method in which a thick part is formed in a lower part of the globe 6, and a lens function is added in this part.

The method of the PTL 2 will be described with reference to FIG. 12. A molten glass 502 taken out of a ring die 501 shown in FIG. 12(a) is inserted into a preliminary die 505 as shown in FIG. 12(b). The preliminary die 505 is a mating die, and a caving concave part 504 is provided in an inner wall surface of the preliminary die 505. A molded glass 503 molded by blow molding and having a projection part 506 is taken out, as shown in FIG. 12(c). Then, the molded glass 503 is heated and softened again, and then inserted into a main die 507 and molded by blow molding, whereby a lens-shaped thick part is formed in an inner wall part of the molded glass 503 as shown in FIG. 12(d).

However, according to this method, it is necessary to perform the blow molding twice, which increases cost. In addition, it is difficult to increase a curvature radius of the thick part, and a high refractive index cannot be expected. Furthermore, the absorptance of light passing through the synthetic resin is proportional to a thickness of the synthetic resin, so that there is a problem that the light extracting efficiency is reduced in the thick part.

In addition, according to the above blow molding method, the intermediate product molded by the injection molding method is cooled down once, and then inserted into the heating apparatus to be softened after its dimension has become stable. At this time, it is necessary to heat the intermediate product to a deflection temperature under load or more, so that there is a large loss in its heating time and energy.

Therefore, it is an object of the present invention to solve the above problems and to provide the lighting globe 6 having preferable light distribution characteristics and light extracting efficiency, at low cost.

Solution To Problem

In order to attain the above object, a light-emitting device includes a base mounting a semiconductor light-emitting element, a reflection plate which reflects light generated from the semiconductor light-emitting element above the semiconductor light-emitting element, a heat sink below the base, and a globe above the heat sink covering the base, the semiconductor light-emitting element, and the reflection plate, wherein a concavo-convex shape is provided in a lower part of an inner wall of the globe.

In addition, a method for producing a synthetic resin globe for a light-emitting device includes injection molding for molding an intermediate product with an injection molding die and blow molding for expanding the intermediate product in the die with compressed air to form a globe shape after softening the intermediate product by a heating apparatus, wherein a concavo-convex shape formed on a core of the injection molding die is transferred to an inner wall of the intermediate product.

Effects of Invention

According to the present invention, by forming the concavo-convex part in the lower part of the inner wall of the globe, the light passing through the lower part of the globe is largely refracted, so that diffusivity can be increased, and a large light distribution angle can be obtained.

Furthermore, according to the production method, in the injection molding step of molding the intermediate product with the injection molding die, the concavo-convex shape formed in the core part of the injection molding die is transferred to the inner wall of the intermediate product, so that the concavo-convex shape in the lower part of the inner wall of the globe can be easily formed into the desired shape.

BRIEF DESCRIPTION OF DRAWINGS

These aspects and features of the present invention will become clear from the following description taken in conjunction with the preferred embodiments thereof with reference to the accompanying drawings.

DESCRIPTION OF EMBODIMENTS

Figure 1A:
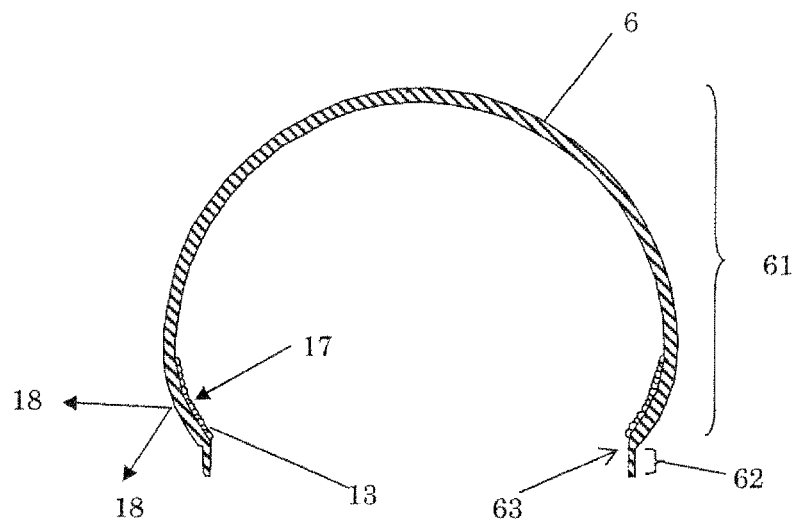
FIG. 1A is a cross-sectional view of a globe shape of a working example of the present invention.

Before the description of the present invention proceeds, it is to be noted that like parts are designated by like reference numerals throughout the accompanying drawings. Hereinbelow, an embodiment and a working example of the present invention will be described with reference to the accompanying drawings.

Structure

FIG. 1A shows a cross-sectional configuration of a globe 6 according to a working example of the present invention. A synthetic resin material containing a diffusion material (polymethylmethacrylate, polystyrene, ABS, AS, polyacetal, polyethylene, polycarbonate, polyester, polypropylene, or chloroethylene) is used as a material of the globe 6. The same resin is used at the time of molding which will be described below. A content of the diffusion material is suppressed to the extent that 90% or more of light transmittance can be ensured in the globe 6. Referring to FIG. 1A, a concavo-convex part 13 is formed in a lower part of an inner wall of the globe 6, and a light 17 inputted into the concavo-convex part 13 is refracted by the concavo-convex part 13, diffused from the globe 6, and emitted as a light 18. The concavo-convex part 13 may have a random hemisphere shape, or may have a ring-shaped Fresnel lens shape. A reason why the concavo-convex part 13 is provided on the inner wall of the globe 6 is that when the concavo-convex part 13 is provided in an outer periphery of the globe 6, an outer appearance is problematic as a lighting apparatus, and dirt or dust is likely to be attached thereon.

The globe 6 according to the working example of the present invention includes a light beam passage part 61, and an insertion part 62 into a heat sink. The insertion part 62 into the heat sink is to be inserted to the heat sink of the lighting apparatus, and has a cylindrical shape which is almost lineal in a longitudinal direction. In addition, the insertion part 61 into the heat sink is a lightproof part, and it is also used for holding the globe 6 at the time of production which will be described below.

Figure 9:
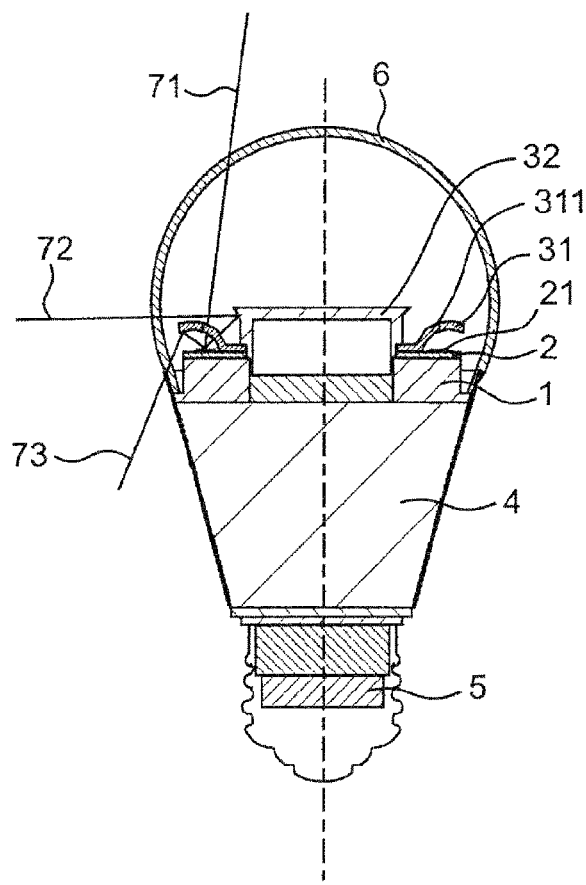
FIG. 9 is a configuration diagram of a conventional LED bulb to realize large distribution light.
Figure 10:
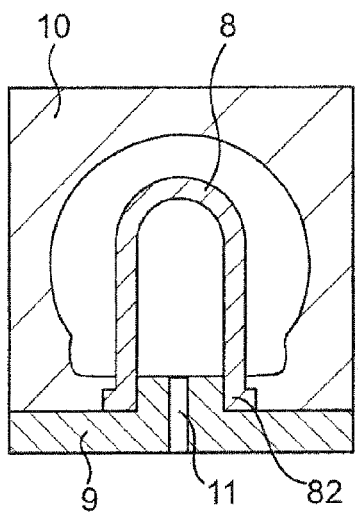
In FIG. 10, (a) is a state diagram when an intermediate product is set in a globe molding die, (b) is a state diagram after the intermediate product is expanded with compressed air, (c) is a cross-sectional view of a globe shape just after blow molding, and (d) is a cross-sectional view after an unnecessary part is cut, in a blow molding die of a conventional example.
Figure 10:
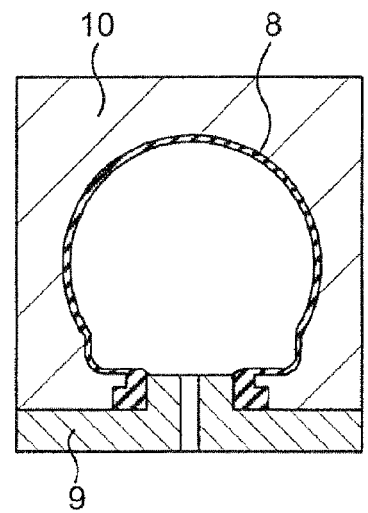
Figure 10:
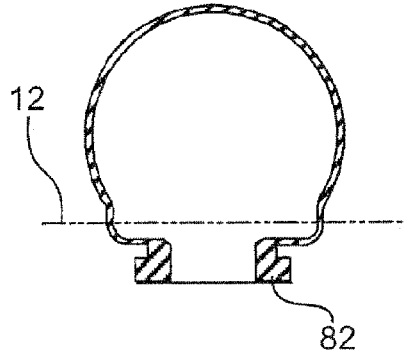
Figure 10:
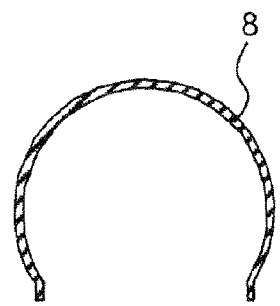
Figure 11:
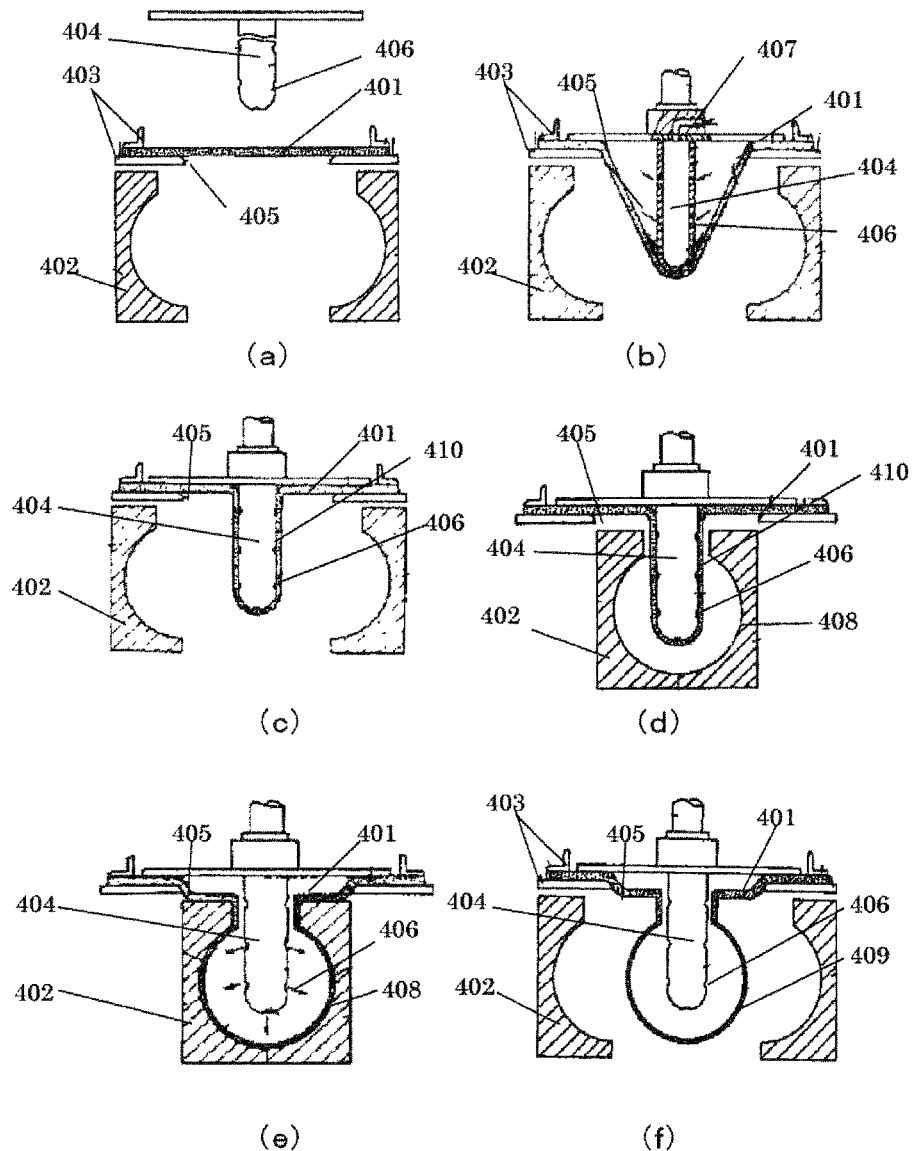
In FIG. 11, (a) is a state diagram when a synthetic resin sheet is set in a blow molding apparatus, (b) is a state diagram when a plug is pressed against the synthetic resin sheet, (c) is a state diagram when the synthetic resin sheet is adhering to the plug by vacuum suction, (d) is a state diagram when a die is closed, (e) is a state diagram when compressed air is supplied to expand the synthetic resin sheet and the synthetic resin sheet adheres to a die surface, and (f) is a state diagram when the die is opened, in PTL 2.
Figure 12:
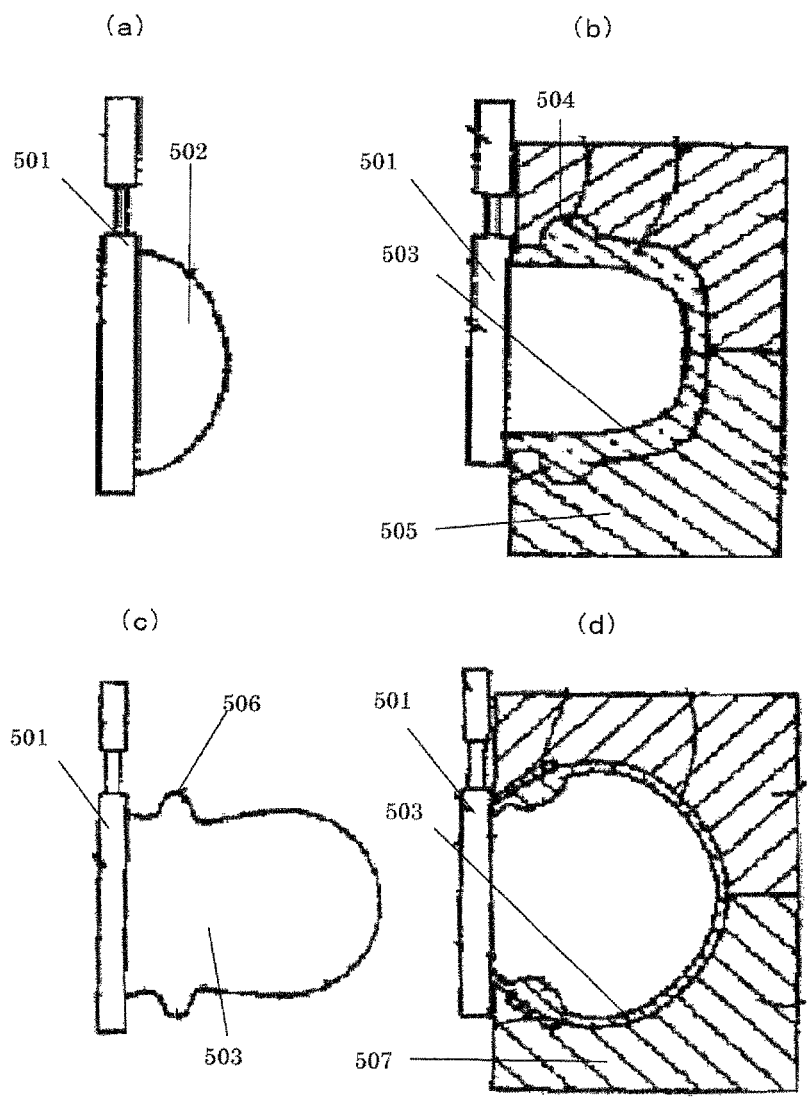
In FIG. 12, (a) is a state diagram of molten glass taken out of a ring die, (b) is a state diagram when the molten glass is molded by blow molding in a preliminary die, (c) is a state diagram of a molded glass molded in the preliminary die, and (d) is a state diagram when the molded glass molded in the preliminary die is molded by blow molding again in a main die, in PTL 3.

In addition, a stepped part 63 is provided in an outer wall surface in a boundary part of the globe 6 between the light beam passage part 61 and the insertion part 62 into the heat sink. A thickness (t2) of the insertion part 62 into the heat sink is ⅔ or less of a thickness (t1) of the light beam passage part 61. In addition, the inner wall of the globe 6 is formed into a smooth shape without any stepped part, except for the concavo-convex part 13. Here, the thickness t1 of the light beam passage part 61 is almost constant, and it is about 1.5 mm in this example. As will be described in a following description part of a production method, since the globe 6 is molded in a compressed state in a height direction, the globe 6 in this example is linear from a lower end face to the stepped part 63, then expands to an outer side and in a radial direction (away from a center of the globe 6), and then becomes a spherical shape. In addition, the globe 6 in this example has a symmetrical shape from front to back and from side to side (a front-back and left-side symmetrical shape). In this expanded part, the light 73 which changes its direction to the lower direction after reflected as described in FIG. 9 can be emitted at a larger light distribution angle.

A region expanded to the outer side has a side surface part corresponding to a position where a semiconductor element 21 is mounted. Or, it has a side surface corresponding to a first reflection plate 31 and a second reflection plate 32. An upper part is a spherical surface.

The concavo-convex part 13 is provided in front of the insertion part 62 into the heat sink (in front of the stepped part 63), that is, it is provided until the boundary between the part transmitting the light and the part not transmitting it.

Figure 1B:
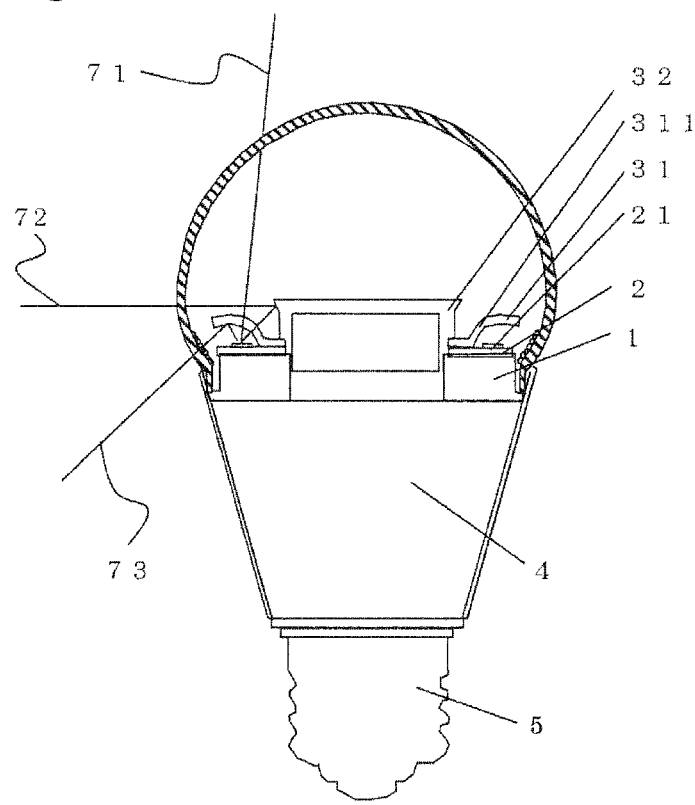
FIG. 1B is a configuration diagram of an LED bulb of the working example of the present invention.

FIG. 1B shows a lighting apparatus according to this example. That is, a base 2 mounting the semiconductor light-emitting element 21 is fixed to an aluminum plate 1 in the lighting apparatus, and the first reflection plate 31 and the second reflection plate 32 are fixed to the aluminum plate 1. A heat sink 4 is fixed around the aluminum plate 1, and a bracket 5 is fixed to a lower part of the heat sink 4. A power supply circuit (not shown) is provided in a void space surrounded by the aluminum plate 1, the heat sink 4, and the bracket 5. The globe 6 is fixed to an upper surface of the aluminum plate 1 to protect the base 2. The light emitted from the semiconductor light-emitting device 21 is divided into a light 71 which passes through a window part 311 of the first reflection plate 31 and goes straight, a light 72 which passes through the window part 311 of the first reflection plate 31, is reflected by the second reflection plate 32, and changes its direction to a lateral direction, and the light 73 which is reflected by the first reflection plate 31 and changes its direction to the lower direction. In order to increase the light distribution angle of the bulb, the light 73 which is reflected by the first reflection plate 31 and passes through the globe 6 is preferably diffused by the globe 6. Therefore, as the material of the globe 6, the synthetic resin material containing the diffusion material is used in general.

Figure 2A:
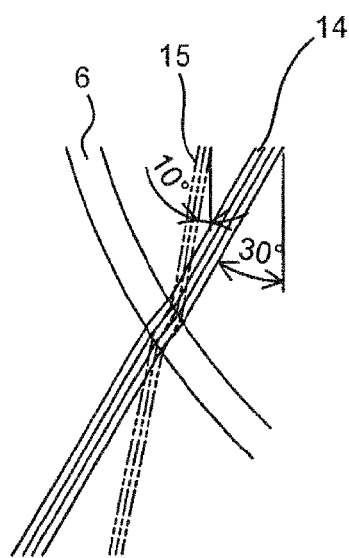
FIG. 2A is a view of light paths in a globe having no concavo-convex shape on an inner wall, as for light paths in the globe of the present invention.
Figure 2B:
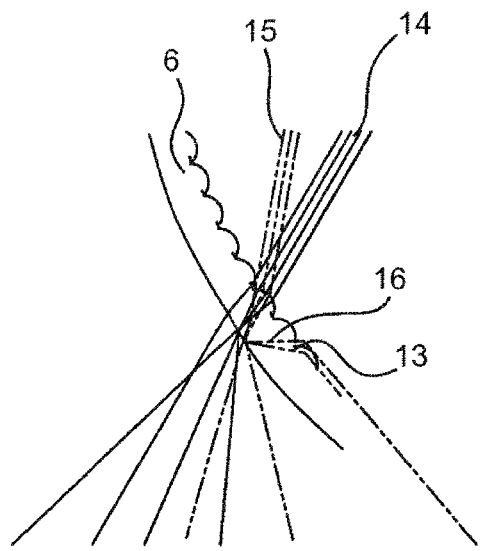
FIG. 2B is a view of light paths in a globe having a semispherical shape on an inner wall, as for light paths in the globe of the present invention.
Figure 2C:
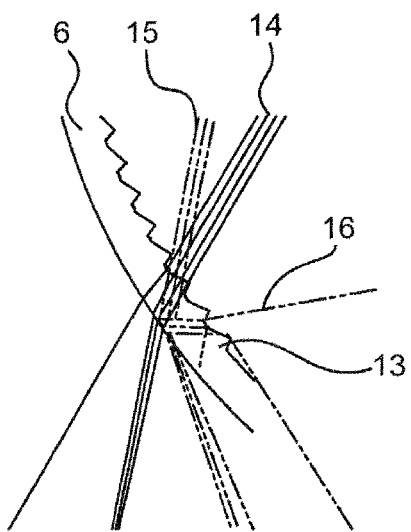
FIG. 2C is a view of light paths in a globe having a ring-shaped Fresnel lens shape on an inner wall, as for light paths in the globe of the present invention.

FIGS. 2A to 2C show differences of light paths inputted to the globe 6 due to differences in inner wall shape of the globe 6. FIGS. 2A to 2C show the light paths in a case where the diffusion material is not contained in the material of the globe 6.

FIG. 2A is a view showing the paths inputted to the globe 6 in a case where a concavo-convex shape is not provided on an inner wall of the globe 6. The light inputted to the globe 6 is refracted at two positions of an input part (input surface (incidence plane)) and an output part (output surface) of the globe 6, due to a difference in refraction index between the material of the globe 6 and air. However, the input surface and the output surface of the globe 6 are parallel to each other, so that even when the input angle (the incident angle) differs, the input angle and the output angle show almost the equal value. For example, as shown in FIG. 2A, as for a light 14 inputted at an angle of 30 degrees with respect to a vertical direction, and as for a light 15 inputted at an angle of 10 degrees with respect to the vertical direction, their output angles are almost equal to the input angles, respectively.

FIG. 2B is a view showing paths of the lights inputted to the globe 6 in the case where the hemispherical shape (concavo-convex part 13) is formed on the inner wall of the globe 6. The random spherical concavo-convex part 13 is formed on the inner wall of the globe 6. The concavo-convex part 13 has the concavo-convex shape in which projecting parts and non-projecting parts are alternately formed. In this case, angles of an input surface and an output surface of the globe 6 differ depending on positions, so that the light inputted to the globe 6 is diffused and outputted from the globe 6. Due to this diffusion effect, brightness of the light to the lower part of the globe 6 is increased, and the light distribution angle of the bulb is increased. The light 14 inputted at the angle of 30 degrees with respect to the vertical direction passes through the globe 6 and outputted while being diffused, but a part of the light 15 inputted at the angle of 10 degrees with respect to the vertical direction is totally reflected by the surface of the globe 6 and comes back to the globe 6 (a light 16 reflected by the surface of the globe 6). Therefore, light extracting efficiency is reduced.

FIG. 2C is a view showing paths of the lights inputted to the globe 6 in the case where the ring-shaped Fresnel lens shape is formed on the inner wall of the globe 6 as the concavo-convex part 13. Triangle concave-convex shapes are formed on the inner wall of the globe 6. In this case, the light inputted to the globe 6 is refracted in a lower direction due to the angle difference between the input surface and the output surface of the globe 6, and outputted from the globe 6. Thus, brightness of the light to the lower part of the globe 6 is increased, and the light distribution angle of the bulb is increased. The light 14 inputted at the angle of 30 degrees with respect to the vertical direction passes through the globe 6 and outputted, but all of the light 15 inputted at an angle of 10 degrees with respect to the vertical direction is totally reflected by the surface of the globe 6 and comes back to the globe 6. Therefore, light extracting efficiency is reduced.

Thus, when the concavo-convex part 13 is formed in the lower part of the inner wall of the globe 6, the output light in the lower direction can be more ensured, so that the more preferable light distribution angle can be obtained. In addition, since the concavo-convex part 13 is formed only in a narrow range of the lower part of the inner wall of the globe 6, it becomes possible to reduce an amount of light returning to the globe 6 after reflected by the surface of the globe 6, to improve the light extracting efficiency, and to reduce the number of semiconductor light-emitting elements. The range requiring the concavo-convex part 13 is positions lower than a top of the second reflection plate 32 shown in FIG. 1B. In addition, in view of the light transmittance, the range of the concavo-convex part 13 is preferably limited to only a desired range.

Since the light 72 reflected by the second reflection plate 32 travels in the upper or horizontal direction, the light 72 is not necessarily diffused in the concavo-convex part 13. On the other hand, since the light 73 reflected by the first reflection plate 31 travels downward, the light 73 can be guided upward after diffused in the concavo-convex part 13. Accordingly, in a case where the range of the concavo-convex part 13 is limited to only a range in which the light 73 reflected by the first reflection plate 31 and changing its direction to the lower direction is inputted, a more effective result is obtained. Thus, the light 73 can be effectively used.

In addition, in view of unevenness of brightness, a size (height) of the concavo-convex part 13 is preferably not too large. Preferably, the height of the concavo-convex part 13 is 0.05 mm or more and 0.10 mm or less. Here, it is to be noted that the height of the concavo-convex part 13 needs to be 0.001 mm or more, in order to produce a scattering effect. The height of the concavo-convex part 13 in this example is set at 0.10 mm.

In addition, a pitch (interval) P of the concavity and the convexity in the concavo-convex part 13 is preferably about 3 times or less of the height of the concavo-convex part 13. Preferably, the pitch P is 0.003 mm or more and 0.30 mm or less. More preferably, the pitch P is 0.15 mm or more and 0.30 mm or less.

In addition, the larger the angle between the concavo-convex part 13 and the outer wall of the globe 6 is, the larger the light distribution angle of the bulb is. However, when the angle between the concavo-convex part 13 and the outer wall of the globe 6 is too large, the amount of the light returning by total reflection is increased. Therefore, the angle between the surface of the concavo-convex part 13 and the outer wall of the globe 6 (with respect to the vertical direction) is preferably set (designed) to be 30 degrees or less.

In addition, the concavo-convex part 13 is provided so as to increase a thickness of the globe 6. That is, the thickness (about 0.10 mm) of the fine concavo-convex part 13 is added to the thickness (1.5 mm) of the light beam passage section 61. Thus, according to this example, the thickness of the concavo-convex part 13 is 1/10 or less of the thickness of the light beam passage section 61, so that there is no large difference in light transmittance between the part having the concavo-convex part 13 and the part not having the concavo-convex part 13. Therefore, unevenness of brightness due to the concavo-convex part 13 can be prevented from being generated.

Figure 1C:
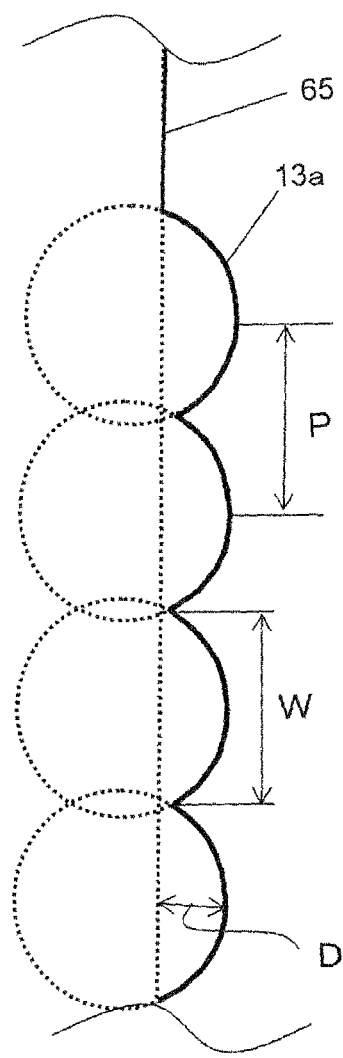
FIG. 1C is an enlarged view of a concavo-convex part formed on a globe inner wall of the working example of the present invention.

FIG. 1C is an enlarged cross-sectional view of the concavo-convex part 13. The concavo-convex part 13 includes a first concavo-convex part 13a composed of a plurality of concavities and convexities, and has the configuration in which spherical surfaces are overlapped. In order to prevent unevenness of brightness, a height D (thickness) from an inner wall 65 needs to be 0.10 mm or less. The height D from the inner wall 65 in this example is 0.070 mm.

As shown in FIG. 1C, since the concavities and convexities of the first concavo-convex part 13a are continuously arranged so as to overlap with each other, the pitch of the concavity and convexity in the first concavo-convex part 13a is equal to a width W of the first concavo-convex part 13a in this example. In addition, a linear part may be formed between the concavity and convexity in the first concavo-convex part 13a (the concavo-convex spherical surfaces may not overlap with each other), and in this case, the pitch P is larger than the width W.

Figure 1D:
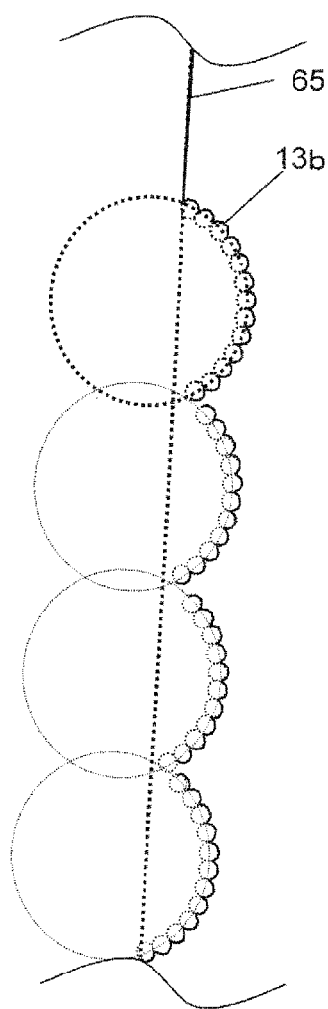
FIG. 1D is an enlarged view of a concavo-convex part formed on a globe inner wall of a variation of the present invention.

Furthermore, a variation of this example is shown in FIG. 1D. FIG. 1D is an enlarged cross-sectional view of the concavo-convex part 13 in this variation. As shown in FIG. 1D, a second concavo-convex part 13b composed of concavities and convexities smaller than the concavity and the convexity of the first concavo-convex part 13a is formed on an upper surface of the first concavo-convex part 13a in FIG. 1C. A height of the second concavo-convex part 13b from a surface of the first concavo-convex part 13a is preferably 0.001 mm or more in view of the light scattering effect, and preferably 0.05 mm or less in view of the light transmittance. A pitch (interval) of the second concavo-convex part 13b is preferably about 3 times or more of a height of the second concavo-convex part 13b. The pitch of the second concavo-convex part 13b is preferably 0.003 mm or more and 0.15 mm or less. In addition, a shape of the first concavo-convex part 13a has a spherical shape similar to the shape of the concavo-convex part 13.

According to the variation shown in FIG. 1D, the light scattering effect can be further improved by forming the second concavo-convex part 13b on the upper surface of the first concavo-convex part 13a.

Production Method

Figure 3:
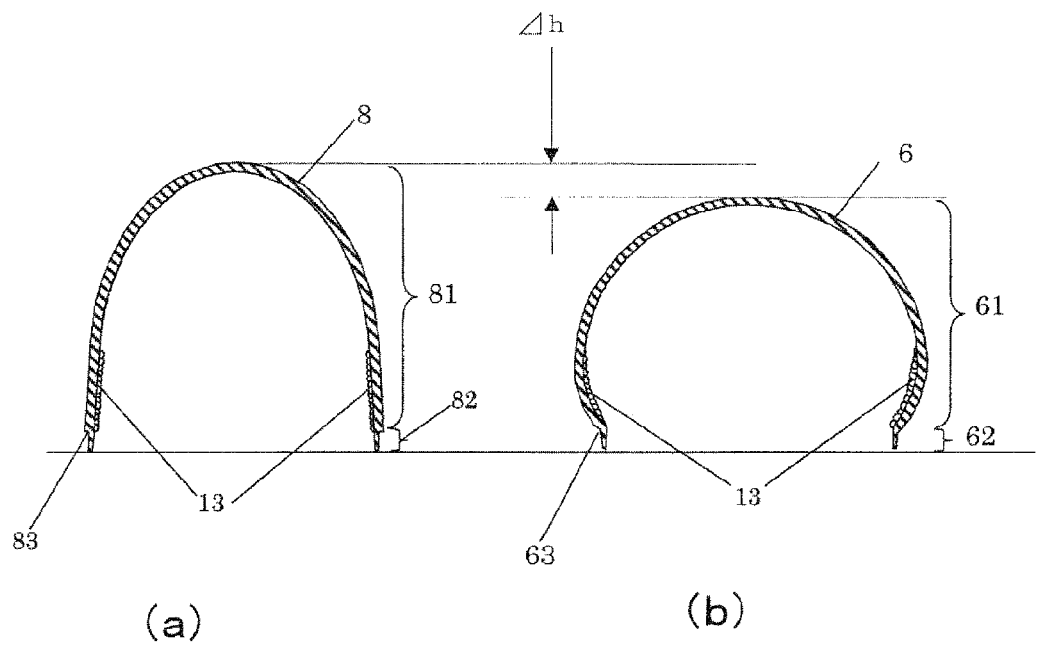
In FIG. 3, (a) is a cross-sectional view of the intermediate product, and (b) is a cross-sectional view of the globe, in the working example of the present invention.

Next, a production method in the working example of the present invention will be described. First, according to the working example of the present invention, an intermediate product 8 shown in FIG. 3(a) is molded by an injection molding method. A height of the intermediate product 8 is higher by Δh than a height of the globe 6 formed after blow molding shown in FIG. 3(b). By increasing Δh, an amount of expansion of the intermediate product (parison) 8 at the time of the blow molding can be reduced, and an amount of change in thickness can be reduced.

Here, the intermediate product 8 is a spherical body having a diameter of 60 to 70 mm as a whole size, and Δh needs to be about 7 mm corresponding to about 10% of the diameter.

The globe 6 in the working example of the present invention includes the insertion part 62 into the heat sink, and the light beam passage part 61 through which the light is emitted. The intermediate product 8 includes a presser margin 82 and a passage part 81 which correspond to the above parts, respectively. In addition, the structure of the globe 6 is provided as described above with reference to FIG. 1.

Figure 5:
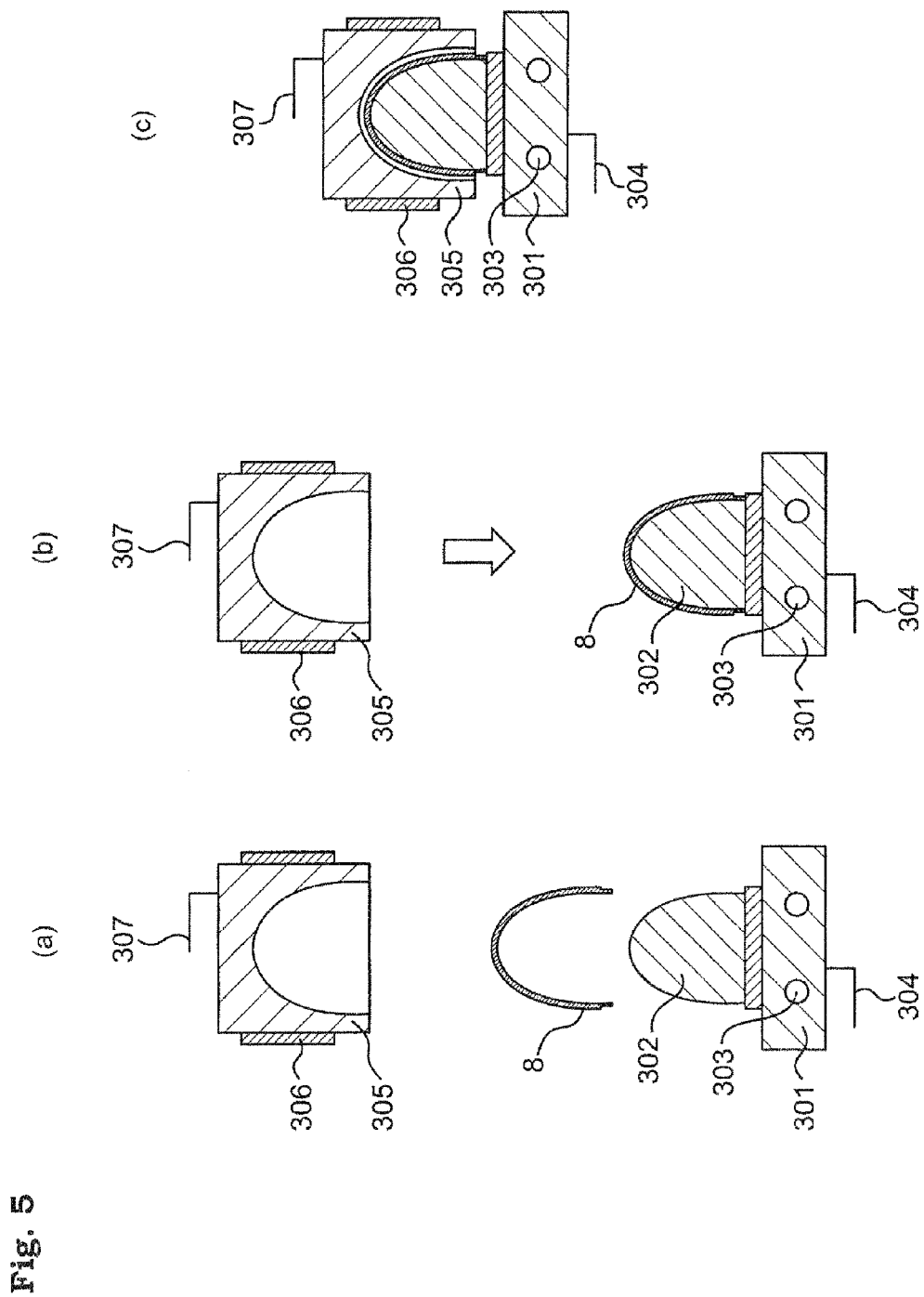
In FIG. 5, (a) is a state diagram when the intermediate product is to be inserted into a heating apparatus, (b) is a view showing an operation of the heating apparatus, and (c) is a state diagram when the intermediate product is heated in the heating apparatus, in the heating apparatus of the working example of the present invention.
Figure 6:
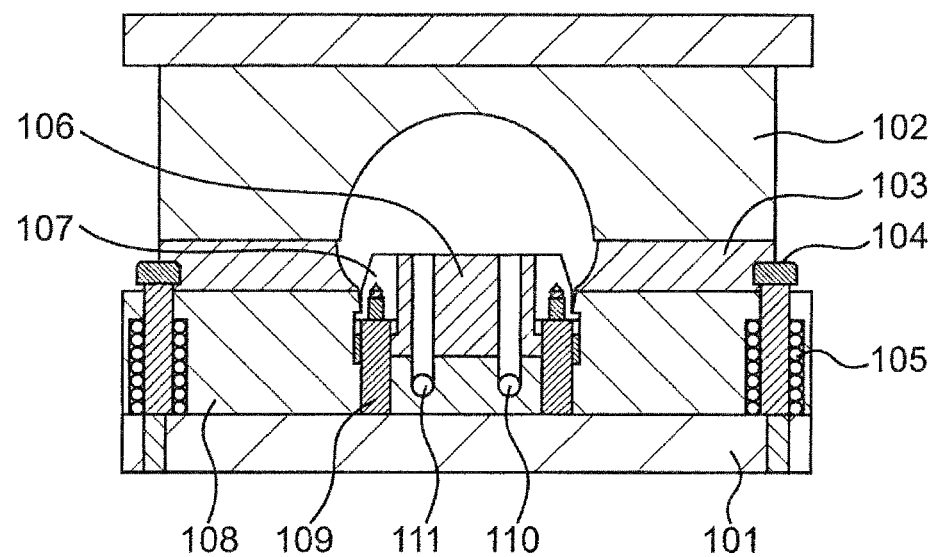
FIG. 6 is a configuration diagram of a blow molding die of the working example of the present invention.
Figure 7:
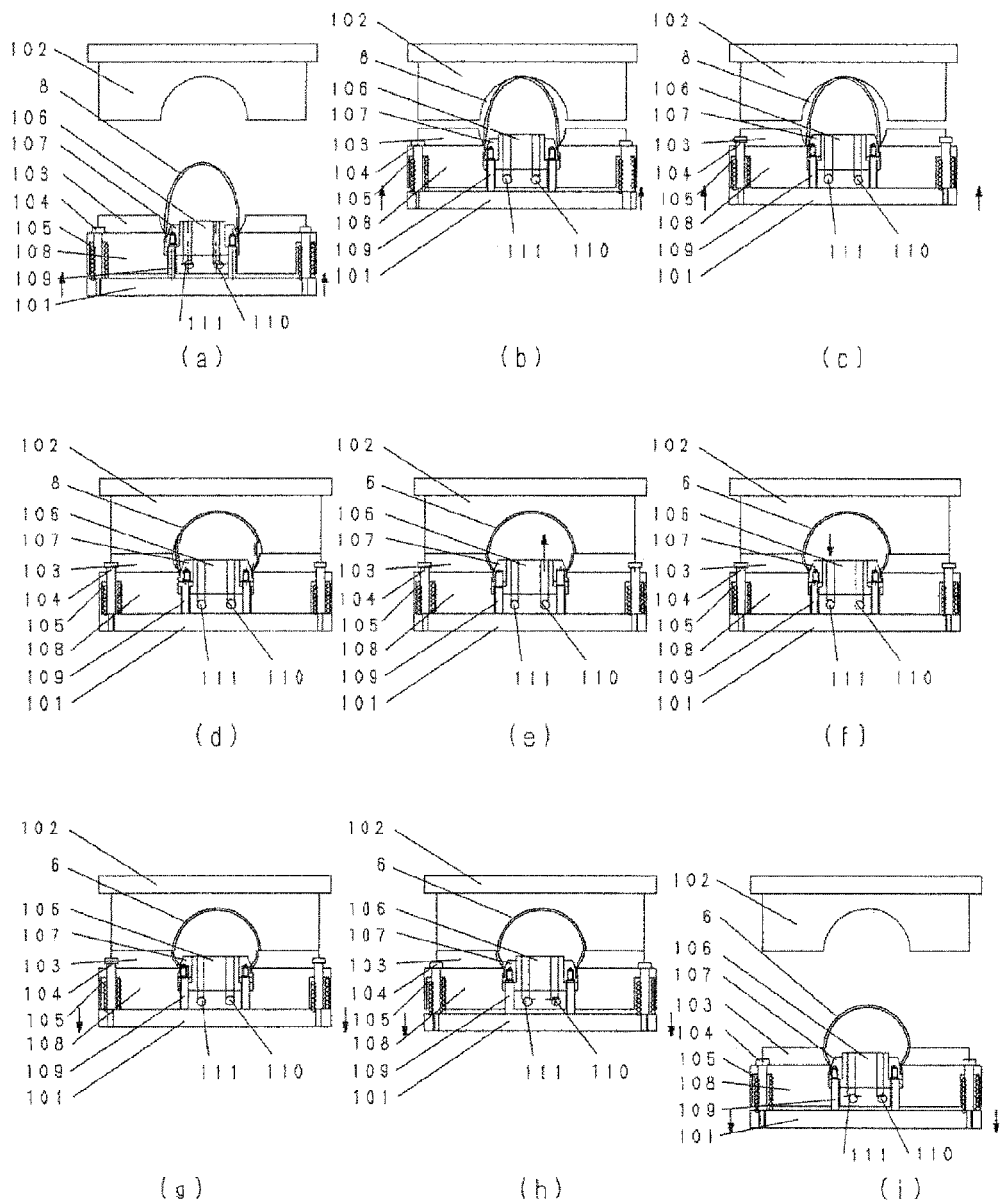
In FIG. 7, (a) is a state diagram when the intermediate product is supplied to the blow molding die, (b) is a state diagram when the intermediate product comes in contact with a stationary-side template, in a step of closing the blow molding die, (c) is a state diagram when a holder part comes in contact with a base die in the step of closing the blow molding die, (d) is a state view when the blow molding die is completely clamped, (e) is a state diagram when compressed air is supplied to expand the intermediate product, (f) is a state diagram when the compressed air is discharged, (g) is a state diagram after a globe forming step is completed and just before the die is opened, (h) is a state diagram when the blow molding die is being opened, and (i) is a state diagram when the blow molding die opening operation is completed, in the blow molding die of the working example of the present invention.

Hereinafter, a production process of the globe 6 in the working example of the present invention will be described. The production process of the globe 6 in this example has a step of the injection molding (FIG. 4), a step of a heat treatment (FIG. 5), and a step of the blow molding (FIGS. 6 and 7)

Step of Injection Molding

The concavo-convex part 13 is previously formed in a lower part of an inner wall in the intermediate product 8, by the injection molding as shown in FIG. 3(a). A configuration of an injection molding die and a process of the injection molding will be briefly described with reference to FIGS. 4(a) to 4(d).

The injection molding die shown in FIGS. 4(a) to 4(d) has a three-plate die in the injection molding steps.

FIG. 4(a) is a view showing a state of the die before mold clamping in an injection molding machine. A sprue bush 201 is arranged in a stationary-side mount plate 203, and a sprue part 202 is formed inside the sprue bush 201 to inject a resin thereto. A runner stripper plate 204 is provided in a lower part of the stationary-side mount plate 203. A stationary-side template 211 is provided in a lower part of the runner stripper plate 204. Each of the stationary-side mount plate 203, the runner stripper plate 204, and the stationary-side template 211 is guided by a support pin 207. In addition, an opening amount between the runner stripper plate 204 and the stationary-side mount plate 203 is controlled by a stop bolt 205 fixed to the runner stripper plate 204. Furthermore, an opening amount between the runner stripper plate 204 and the stationary-side template 211 is controlled by a puller bolt 206 fixed to the runner stripper plate 204.

In the stationary-side template 211, an outer periphery shape 210 of the intermediate product 8 is formed, and a runner part 208 for pouring the resin onto an upper part of the outer periphery shape 210 is formed. A runner gate 209 to isolate the runner and the intermediate product 8 is formed when a tip end of the runner part 208 is fastened with a tapered shape.

A movable-side template 216 is arranged in a lower part of the stationary-side template 211, and a core 213 is fixed to a center part of the movable-side template 216. A concavo-convex shape corresponding to the concavo-convex part 13 of the intermediate product 8 is formed in a lower part of the core 213. A stripper plate 214 for pushing out the intermediate product 8 after the molding is arranged between the movable-side template 216 and the core 213. The stripper plate 214 is connected to an eject plate 217 through an eject pin 215. The eject plate 217 is in contact with an eject rod 218 of the injection molding apparatus. The movable-side template 216 and the stationary-side template 211 are connected by a tension link 212.

The movable-side template 216 is lifted by a mold clamping drive apparatus (not shown) in the injection molding machine, to perform a mold clamping operation. Then, as shown in FIG. 4(b), a molten resin is injected from the sprue part 202 by an injection apparatus (not shown), and a void part 219 formed between the stationary-side template 211 and the core 213 is filled with the molten resin, whereby the intermediate product 8 is molded. The concavo-convex shape formed in the core 213 is transferred to the lower part of the inner wall of the intermediate product 8, corresponding to the concavo-convex part 13.

Then, the molten resin is cooled down and solidified in the die. Then, as shown in FIG. 4(c), a die opening operation is performed by the mold clamping drive apparatus (not shown), and the stationary-side template 211 and the movable template 216 are separated. Thus, the runner part 208 and the intermediate product 8 are isolated by the runner gate 209. Furthermore, the die opening operation is continued, and the movable template 216 is pulled by the tension link 212, so that the movable template 216 is separated from the stationary-side template 211. Then, the runner stripper plate 204 is separated from the stationary-side template 211 by the puller bolt 206.

As shown in FIG. 4(d), when the eject rod 218 is protruded by an eject drive apparatus (not shown), the stripper plate 214 is protruded through the eject plate 217 and the eject pin 215, so that the intermediate product 8 is isolated from the core 213. Then, the intermediate product 8 and a sprue runner 220 are taken off by a takeoff apparatus (not shown).

The intermediate product 8 molded by the injection molding method is taken off the injection molding die after cooled down in the injection molding die until its average temperature reaches a deflection temperature under load or less of the resin material. Then, the intermediate product 8 is inserted into a heating apparatus for the next heating treatment step. For example, in a case of a polycarbonate resin material, the deflection temperature under load is 120° C. to 130° C., so that the temperature at which it is taken out of the injection molding die is 100° C. to 120° C.

Step of Heating Treatment

A configuration of the heating apparatus in the working example of the present invention is shown in FIGS. 5(a) to 5(c). A heater 303 and a temperature sensor 304 are provided in a pre-heat base 301 fixed to a table (not shown), and a temperature of the pre-heat base 301 is controlled to be kept at a constant temperature (in the case of the polycarbonate resin material, 180° to 230° C.) higher than the deflection temperature under load of the resin material. A parison holder 302 fixed to the pre-heat base 301 is kept at a temperature (in the case of the polycarbonate resin material, 150° to 200° C.) higher than the deflection temperature under load of the resin material, by heat transferred from the pre-heat base 301. Here, a gap between the parison holder 302 and the intermediate product (parison) 8 is set to be as close as 0.1 mm to 0.5 mm. Ceramic coating having a high water-shedding property is provided on a surface of the parison holder 302.

Figure 4:
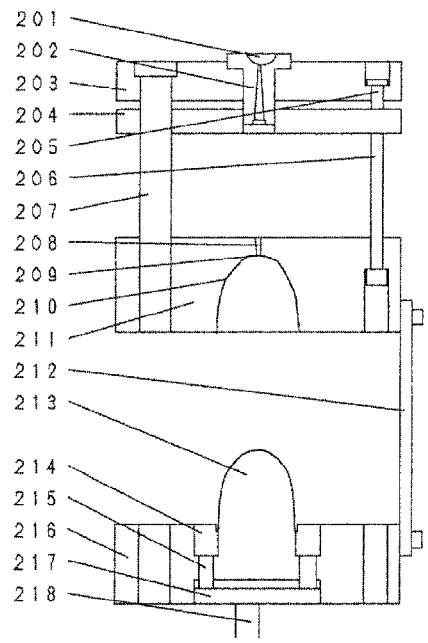
In FIG. 4, (a) is a state diagram before molding (die is opened), (b) is a state diagram after mold clamping and injection, (c) is a state diagram after injection and cooling is completed and die is opened, (d) is a state diagram when a molded product (intermediate product) is taken out, in an injection molding die in the working example of the present invention.
Figure 4:
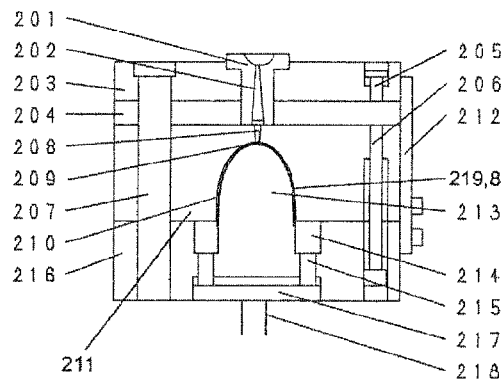
Figure 4:
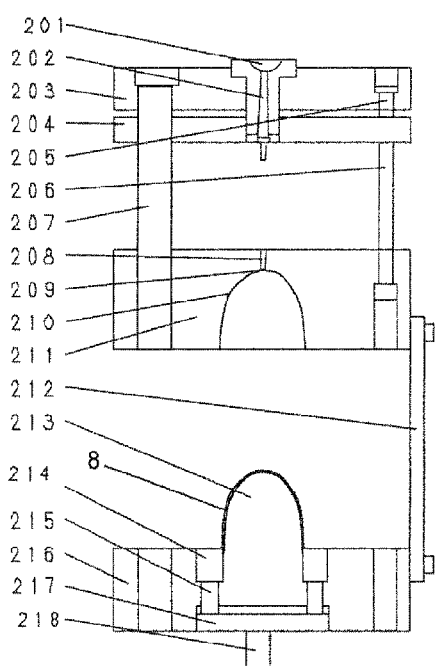
Figure 4:
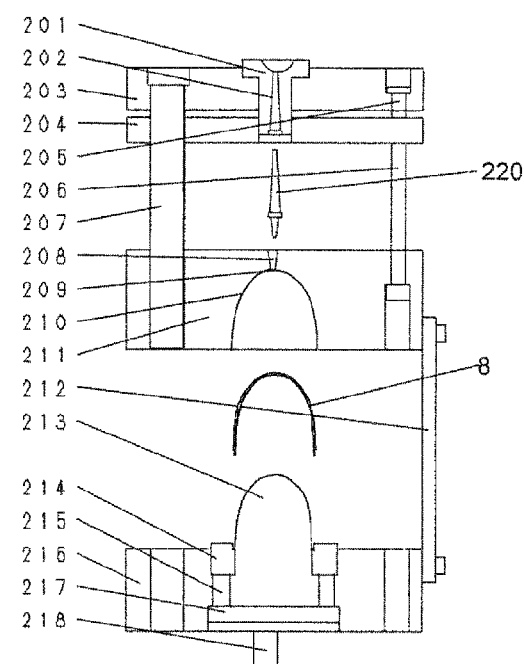

The intermediate product 8 taken off the injection molding die by the takeoff apparatus (not shown) as shown in FIG. 4 is inserted to the parison holder 302 as shown in FIG. 5(a). Then, as shown in FIG. 5(b), a pre-heat block 305 connected to a vertical drive apparatus (not shown) is lowered by the vertical drive apparatus and stops at an appropriate position with respect to the intermediate product 8 (refer to FIG. 5(c)). At this time, a distance between the pre-heat block 305 and the intermediate product 8 is kept at a constant space equal to or below 1 mm. Similar to the parison holder 302, ceramic coating having a high water-shedding property is provided on a surface of the pre-heat block 305. A band heater 306 and a temperature sensor 307 are provided in the pre-heat block 305. A temperature of the pre-heat block 305 is controlled to be a temperature (in the case of the polycarbonate resin material, 200° to 300° C.) which is sufficiently higher than the deflection temperature under load of the resin material. After a predetermined period, the temperature of the intermediate product 8 reaches the deflection temperature under load or more of the resin material (in the case of the polycarbonate resin material, 130° to 140° C.), and the intermediate product 8 is softened. While the intermediate product 8 is in the softened state, the pre-heat block 305 is lifted by the vertical drive apparatus, and the intermediate product 8 is transferred to the blow molding die by the takeoff apparatus (not shown).

When the ceramic coating is provided on each surface of the parison holder 302 and the pre-heat block 305, the intermediate product 8 rises in temperature from the surface due to heat conduction of heat emitted from the surface of the parison holder 302 and pre-heat block 305, and also rises in temperature due to heat generation from the inside of the resin due to radiation heat of a far-infrared region. Therefore, the intermediate product 8 can rapidly rise in temperature, and a temperature distribution in a thickness direction can become more uniform.

Since the intermediate product 8 is not heated by a hot-air oven, the intermediate product 8 can be kept at the uniform temperature with preferable heat efficiency. In addition, the temperature can be raised in a short time, and a processing time can be short.

Step of Blow Molding

A process after the softened intermediate product 8 has been conveyed to the blow molding die will be described with reference to FIGS. 6 and 7.

Firstly, FIG. 6 shows a configuration diagram of the blow molding die for producing the globe 6 of the synthetic resin. A holder 108 is connected to a die base 101 through a spring guide 104 and a spring 105, and a movable-side temperate 103 is fixed to an upper part of the holder 108. A wedge guide 106 is fixed to a center part of the holder 108, and a wedge 107 is in contact with an outer periphery of the wedge guide 106. A shaft 109 is fixed to the wedge 107. The shaft 109 passes through the holder 108 and is in contact with the die base 101. A stationary-side template 102 is arranged in an upper part of the movable-side template 103. The wedge guide 106 has a compressed air supply port 110 for injecting compressed air and a compressed air discharge port 111 for discharging the air from the die.

Figure 8:
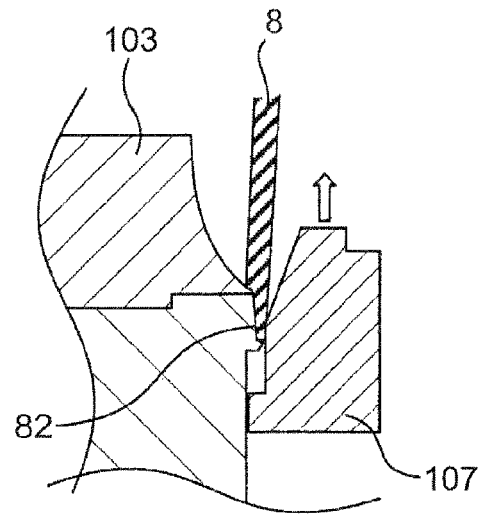
In FIG. 8, (a) is a view showing a relationship between the intermediate product and a wedge under a condition that the wedge is lowered, and (b) is a view showing a relationship between the intermediate product and the wedge under a condition that the wedge is lifted, in the blow molding die of the working example of the present invention.
Figure 8:
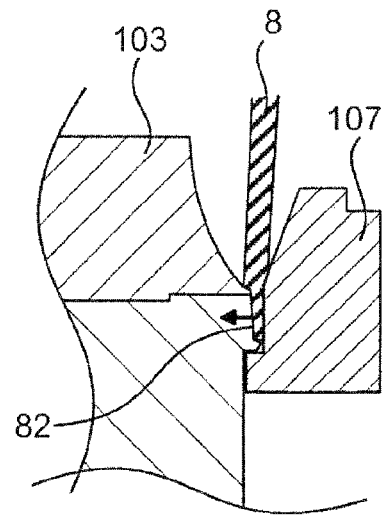

The intermediate product 8 softened by the heating apparatus is inserted in the holder 108 by a conveyance apparatus (not shown) (refer to FIG. 7(a)). After the intermediate product 8 has been inserted, the movable-side template 103 is lifted by a mold clamping apparatus (not shown). When a top surface of the intermediate product 8 comes into contact with the stationary-side template 102 (refer to FIG. 7(b)), the spring 105 deflects, and a gap between the holder 108 and the die base 101 starts to reduce. By the above operation, the shaft 109 fixed to the wedge 107 comes in contact with the die base 101, and the wedge 107 is lifted. When the wedge 107 is lifted, the presser margin 82 is compressed in a direction so that its inner periphery part expands, and the intermediate product 8 is firmly fixed to the holder 108 (refer to FIG. 7(c)). FIGS. 8(a) and 8(b) show enlarged views of a relationship between the wedge 107 and the intermediate product 8 at this time.

FIG. 8(a) is a view showing a relationship between the intermediate product 8 and the wedge 107 in a state the wedge 107 is lowered. FIG. 8(b) is a view showing a relationship between the intermediate product 8 and the wedge 107 in a state the wedge 107 is lifted.

The mold clamping operation is further continued, so that the intermediate product 8 is compressed and expands in a circumferential direction (refer to FIG. 7(d)). After a predetermined period, the presser margin 82 of the intermediate product 8 is cooled down. When the temperature of the presser margin 82 becomes sufficiently lower than the deflection temperature under load of the resin material, high-pressure air is injected from the compressed air supply port 110 by a compressed air generation apparatus (not shown). Here, a pressure of the injected air is required for the intermediate product 8 to undergo plastic deformation so that the whole outer surface of the intermediate product 8 is pressed against the inner wall of the stationary-side template 102. In this example, the high-pressure air of 3 MPa to 4 MPa is injected (refer to FIG. 7(e)).

When the intermediate product 8 is expanded by injecting the high-pressure air, the globe 6 having the desired globe configuration is formed. At this point, the compressed air discharge port 111 is opened to discharge the air from the die (refer to FIG. 7(f)). Then, when the temperature of the whole globe 6 reaches the deflection temperature under load or less of the resin material, the die is opened by a mold clamping drive apparatus (not shown) and changed in its states to FIG. 7(g), FIG. 7(h), and FIG. 7(i) in this order. Then, the globe 6 is taken off by the conveyance apparatus (not shown).

According to the above method, the stepped part 63 (FIG. 1) is provided in the outer wall surface of the globe 6, and the thickness t2 of the insertion part 62 into the heat sink is made thinner than the thickness t1 of the light beam passage part 61. Thus, a diameter of an innermost periphery of the globe 6 can be large, and an outer diameter of the reflection plate can be increased, whereby a larger light distribution angle can be obtained.

In addition, when the stepped part 63 is provided in the outer periphery of the intermediate product 8, and the thickness of the insertion part into the holder is made thinner than the thickness of the deformed part in its upper part, a temperature gradient between the insertion part into the holder and the deformed part in its upper part can be increased. Therefore, it becomes possible to suppress generation of an outer appearance defect due to bleaching in an upper part of the insertion part into the holder at the time of the blow molding, or defects such as the deformation of the insertion part.

Furthermore, since the inner wall of the intermediate product 8 is compressed and the intermediate product 8 is fixed by the wedge structure, it is not necessary to provide a projected shape to fix the intermediate product 8 to the holder. It is not necessary to provide a step of cutting an unnecessary part after the blow molding.

The thickness t2 of the insertion part 62 into the heat sink, and the thickness of the insertion part into the holder of the intermediate product 8 are preferably thin. However, in order to satisfy mechanical strength of the insertion part 62 into the heat sink, the thickness t2 of the insertion part 62 into the heat sink is 0.4 mm or more in this example. In addition, the reason why the thickness t2 of the insertion part 62 into the heat sink is set to be $2/3$ or less of the thickness t1 of the light beam passage part 61 is that when it is thicker than $2/3$, the temperature is lowered before the compressed air is injected at the time of the blow molding, so that the outer appearance defect such as bleaching is generated in its vicinity, or conversely, the temperature of the fixing part is raised and the shape of the fixing part is changed.

According to this example, since the stepped part is provided and the thickness differs in the globe, a temperature difference is generated, so that the bleaching or shape change is not generated in the light beam passage part. In addition, since the insertion part into the heat sink of the globe 6 can be large, the light can be emitted with large distribution. Furthermore, since the insertion part is thinned, it can be easily inserted into the heat sink 4.

In addition, since the thickness of the globe 6 can be $2/3$ or more of the thickness of the intermediate product 8 before the blow molding, an amount of deformation of the concavo-convex part 13 of the intermediate product 8 formed by the injection molding can be extremely small, so that the concavo-convex part on the lower part of the inner wall of the globe 6 after the blow molding can be easily formed into the desired shape. Since the compressed air to push the inner wall of the globe 6 at the time of the blow molding can be applied with the uniform pressure to the surface of the globe 6, the fine concavo-convex shape is maintained without being largely deformed.

In addition, in the injection molding step, the synthetic resin material for the intermediate product 8 is injected into the injection molding die and then cooled down, and it is taken out of the die when the average temperature of the intermediate product 8 reaches the deflection temperature under load or less of the resin material. According to this method, since a center of the intermediate product 8 in the thickness direction is in a high temperature state compared with a surface layer thereof, the intermediate product 8 can be heated to the uniform temperature in the thickness direction with low heat capacity and uniform softened state can be obtained, when the surface layers inside and outside of the intermediate product are immediately heated by the heating apparatus.

It is to be noted that, by properly combining the arbitrary embodiments of the aforementioned various embodiments, the effects possessed by them can be produced.

The present invention is applied to the production of the synthetic resin globe having the concavo-convex shape on the inner wall, but can be applied to production of a general blow-molded product which is thick and has a fine shape on its inner wall.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2011-057510 filed on Mar. 16, 2011, including specification, claims, drawings, and summary are incorporated herein by reference in its entirety.

The invention claimed is:

1. A light-emitting device comprising:
   a base;
   a semiconductor light-emitting element mounted on the base;
   a globe covering the base and the semiconductor light-emitting element;
   a reflection plate, above the semiconductor light emitting element and covered by the globe, positioned to direct light generated by the semiconductor light-emitting element to a lower position of the globe lower than the reflection plate, and not to reflect the light generated by the semiconductor light-emitting element to an upper position of the globe higher than the reflection plate; and
   a concavo-convex part located on the globe only at the lower position of the globe lower than the reflection plate, wherein
   the reflection plate comprises a first reflection plate and a second reflection plate,
   the first reflection plate is positioned directly above the semiconductor light-emitting element,
   the second reflection plate is provided separately from the first reflection plate and positioned above the first reflection plate, and
   the first reflection plate has a window part as an opening in the reflection plate, and a light emitted from the semiconductor light-emitting element goes to the second reflection plate through the first reflection plate via the window part.

2. The light-emitting device according to claim 1, comprising a plurality of said semiconductor light emitting element, wherein
   the first reflection plate is arranged corresponding to each of the semiconductor light-emitting elements.

3. The light-emitting device according to claim 1, further comprising a heat sink which includes a portion positioned under the base and a portion positioned under the globe.

4. The light-emitting device according to claim 1, wherein a height of the concavo-convex part is 0.1 mm or less from the inner wall of the globe.

5. The light-emitting device according to claim 1, wherein the concavo-convex part comprises a first concavo-convex part and a second concavo-convex part provided on the first concavo-convex part.

6. The light-emitting device according to claim 5, comprising a plurality of the first and second concavo-convex parts, wherein
the second concavo-convex parts are provided on the first concavo-convex parts, respectively.

7. The light-emitting device according to claim 5, wherein the first concavo-convex part and the second concavo-convex part each have a spherical shape.

8. The light-emitting device according to claim 7, wherein a height of the second concavo-convex part is 0.15 mm or less from a surface of the first concavo-convex part.

9. The light-emitting device according to claim 3, wherein:
the globe includes an insertion part inserted in the heat sink and having an outer wall with a stepped part; and
a thickness of the stepped part is smaller than a thickness of the globe.

10. The light-emitting device according to claim 9, wherein the stepped part is provided between a light passage part of the globe and the insertion part.

11. The light-emitting device according to claim 9, wherein a thickness of a lower part of the stepped part is smaller than ⅔ of a thickness of an upper part of the stepped part.

12. The light-emitting device according to claim 9, wherein a thickness of a lower part of the stepped part is 0.4 mm or more.

13. The light-emitting device according to claim 1, wherein a side surface part of the globe corresponding to a position of the semiconductor light-emitting element expands outward,
a part of the globe positioned above the semiconductor light-emitting element has a spherical shape, and
a shape of the globe is front-back and left-side symmetrical.

14. The light emitting device according to claim 1, wherein the concavo-convex part includes a semispherical shape or a Fresnel lens shape.

15. The light emitting device according to claim 1, wherein the concavo-convex part is on an inner wall of the globe.

16. A light-emitting device comprising:
a base;
a semiconductor light-emitting element mounted on the base;
a globe covering the base and the semiconductor light-emitting element;
a reflection plate, above the semiconductor light emitting element and covered by the globe, which reflects light generated from the semiconductor light-emitting element; and
a concavo-convex part located on the globe only at a lower position of the globe lower than the reflection plate,
wherein a thickness of the globe at a higher position than the reflection plate is thinner than a combined thickness of the concavo-convex part and the globe at the lower position,
the reflection plate comprises a first reflection plate and a second reflection plate,
the first reflection plate is positioned directly above the semiconductor light-emitting element,
the second reflection plate is provided separately from the first reflection plate and positioned above the first reflection plate, and
the first reflection plate has a window part as an opening in the reflection plate, and a light emitted from the semiconductor light-emitting element goes to the second reflection plate through the first reflection plate via the window part.

17. The light emitting device according to claim 16, wherein the concavo-convex part is on an inner wall of the globe.

18. The light-emitting device according to claim 1, wherein the second reflection plate is positioned nearer a center of the globe than the first reflection plate.

19. The light-emitting device according to claim 1, wherein the first reflection plate reflects the light to a lower direction while the second reflection plate reflects the light to a lateral direction.

20. The light-emitting device according to claim 1, wherein a surface shape of the first reflection plate for reflecting the light is different from a surface shape of the second reflection plate for reflecting the light.

* * * * *